United States Patent
Sweeny et al.

(10) Patent No.: US 7,139,911 B2
(45) Date of Patent: Nov. 21, 2006

(54) PASSWORD EXPOSURE ELIMINATION FOR DIGITAL SIGNATURE COUPLING WITH A HOST IDENTITY

(75) Inventors: James W. Sweeny, Millbrook, NY (US); Messaoud Benantar, Austin, TX (US); John J. Petreshock, Poughkeepsie, NY (US); Thomas L. Gindin, Potomac, MD (US); John C. Dayka, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 09/795,203

(22) Filed: Feb. 28, 2001

(65) Prior Publication Data

US 2002/0144107 A1 Oct. 3, 2002

(51) Int. Cl.
*H04L 9/00* (2006.01)
*H04K 1/00* (2006.01)

(52) U.S. Cl. ............... 713/156; 713/175; 713/176; 713/157; 713/182

(58) Field of Classification Search ........ 713/200–202, 713/182, 175, 156, 157, 173, 176, 177; 380/23–30, 380/279, 282; 709/248, 200
See application file for complete search history.

(56) References Cited

U.S. PATENT DOCUMENTS

| | | | |
|---|---|---|---|
| 4,868,877 A * | 9/1989 | Fischer | 713/157 |
| 5,214,702 A * | 5/1993 | Fischer | 380/30 |
| 5,659,616 A | 8/1997 | Sudia | |
| 5,671,279 A | 9/1997 | Elgamal | |
| 5,712,914 A | 1/1998 | Aucsmith et al. | |
| 5,717,758 A | 2/1998 | Micall | |
| 5,774,552 A | 6/1998 | Grimmer | |
| 5,815,574 A | 9/1998 | Fortinsky | |
| 6,304,974 B1 * | 10/2001 | Samar | 713/201 |
| 6,421,781 B1 * | 7/2002 | Fox et al. | 713/201 |
| 6,742,048 B1 * | 5/2004 | Walsh | 709/248 |
| 6,754,829 B1 * | 6/2004 | Butt et al. | 713/200 |
| 6,854,056 B1 | 2/2005 | Benontar | |
| 2002/0120848 A1 * | 8/2002 | Mont et al. | 713/175 |
| 2002/0152382 A1 * | 10/2002 | Xiao | 713/173 |

FOREIGN PATENT DOCUMENTS

WO WO 00/04673 1/2000

OTHER PUBLICATIONS

Beale, Matthew W., "WorldKey Launches International E-Commerce Security Service," E-Commerce Times, Nov. 2, 1999.

(Continued)

*Primary Examiner*—Ayaz Sheikh
*Assistant Examiner*—Shin-Hon Chen
(74) *Attorney, Agent, or Firm*—Cantor Colburn LLP

(57) ABSTRACT

A method of certifying a host-identification mapping extension included in a digital certificate, the digital certificate issued and signed by a specific certification authority. In an exemplary embodiment of the invention, the method includes assigning a trust value for each certification authority included in a set of certification authorities. A digital certificate containing the host-identification mapping extension therein is received, with the host-identification mapping extension further containing a plurality of identification attributes therein. The plurality of identification attributes are evaluated, along with the trust value assigned to the specific certification authority issuing the digital certificate. A determination is then made, based upon the plurality of identification attributes and the trust value, as to whether the host-mapping extension is to be certified.

10 Claims, 2 Drawing Sheets

OTHER PUBLICATIONS

Cassel, Kevin, Abstract Syntax Notation, Feb. 6, 1996.
Gerck, E. and MCG, Overview of Certification Systems: X.509, CA, PGP and SKIP; MCG Organization, Copyright 1997-1998.
Jueneman, Bob, Name Changes and Certificates, Sep. 11, 1997.
M. Moser, C. Bining, SG. Hild, and L. O'Conner; "Method of Establishing the Trust-Worthiness Level of a Participant In a Communication Connection," IBM INFOGATE, Nov. 23, 1998.

O'Higgins, Brian; "Handbook: Certification Austhories—Beyond Intranet Firewalls," INTRANE, Jul. 21, 1997.
"An Introduction to the Windsow 2000 Public-Key Infrastructure," Microsoft TechNet, 1999.
JTAP Project—X509 Digital Certificate Strand; Digital Cerficate Log.

* cited by examiner

PASSWORD EXPOSURE ELIMINATION FOR DIGITAL SIGNATURE COUPLING WITH A HOST IDENTITY

BACKGROUND

PKI, or Public Key Infrastructure, is a set of operating system and application services that supports public key cryptography. Public key cryptography is an important technology for e-commerce, internet, intranet and other applications requiring "distributed security" (i.e., security in which the participants are not part of the same network and have no common security credentials). Specifically, public key cryptography provides two fundamental operations: encryption and signing. By encrypting electronic data, the goal is for the data to be read only by the intended party. With public key cryptography, a sender can encrypt a message using the specific public key corresponding to the receiver. In turn, only the receiver (using his or her private key) can decrypt the message.

On the other hand, signing is used to authenticate the identity of another party. Again, public key cryptography is involved, but in this instance a message may be encrypted by a sender's private key. Anyone can decrypt the message with the sender's corresponding public key, but the identity of the sender is established because the message could only have been encrypted by the sender's private key.

Public keys are typically packaged as digital certificates, which contain the public key, as well a set of other attributes such as the keyholder's name, what the keyholder is allowed to do, and under what circumstances the certificate is valid. The X.509 v3 digital certificate is an International Telecommunication Union (ITU) standard defining the format and content of digital certificates. The keyholder's attributes are cryptographically bound to the public key because the certificate is digitally signed by a Certificate Authority (CA) that issued it. The CA, or issuer, is a trusted entity associated with the keyholder; thus, the certificate's authenticity and correctness is vouched for by the issuer's signature.

In certain instances, however, the subject or keyholder identity carried in the digital certificate may not exactly match the keyholder's identity on a particular host system. For example, FIG. 1 illustrates an exemplary representation of an X.509 v3 digital certificate 10 and an exemplary system registry 12 for a host server. As can been seen from the subject identity 14 included in the digital certificate, the particular formatting thereof does not correspond to the subject identity 16 in the system registry, even though they are one and the same. In order to establish authorization and gain access, therefore, a flexible means has been developed to associate additional attributes to a digital certificate, in addition to the standard attributes. A host-identity mapping extension enables the coupling of a X.509 v3 digital certificate to a host application server. The host-identity mapping extension may include additional attributes therein to provide proof of identity possession (PIP). For instance, the PIP field can include the password which corresponds to the identity on the host server. If the password and user id are properly accompanied by an appropriate signature, then access to a host server may be achieved.

However, host-identity mapping extensions used in digital certificates are not without drawbacks. This is particularly the case when dealing with an external or third party CA. If the CA is run by an organization outside the host system, then the authenticating secret (password) is exposed to an outside agency which may not necessarily be trustworthy. If the integrity of the CA is compromised, then the password could be used to impersonate the keyholder on the host system. Yet, if the password is not embedded in the extension, the host server must then rely upon the CA to be trustworthy enough to verify the validity of the subject id, without proof of possession. It may be appropriate for the host system to honor the host-identity mapping extension of a digital certificate if the certificate is issued by a local CA, but not honor the extension if the certificate is issued by a public or third party CA. Because most PKIs understand only a binary trust value as applied to CAs (i.e., "trusted" or "not trusted"), the digital signature coupling with host identities can be problematic.

SUMMARY

The above discussed and other drawbacks and deficiencies of the prior art are overcome or alleviated by a method of certifying a host-identification mapping extension included in a digital certificate, the digital certificate issued and signed by a specific certification authority. In an exemplary embodiment of the invention, the method includes assigning a trust value for each certification authority included in a set of certification authorities. A digital certificate containing the host-identification mapping extension therein is received, with the host-identification mapping extension further containing a plurality of identification attributes therein. The plurality of identification attributes are evaluated, along with the trust value assigned to the specific certification authority issuing the digital certificate. A determination is then made, based upon the plurality of identification attributes and the trust value, as to whether the host-mapping extension is to be certified.

In a preferred embodiment, the trust value corresponds to either "not trusted"; "trusted"; or "highly trusted". The plurality of identification attributes further includes a required host name, a required subject identification name and an optional proof of identity possession entry. If the trust value assigned to the certification authority is "highly trusted", then the host-identification mapping extension is certified regardless of whether the proof of identity possession data entry appears in the host-identification mapping extension. If the trust value assigned to the certification authority is "trusted", then the host-identification mapping extension is certified only if the proof of identity possession data entry appears in the host-identification mapping extension. Finally, if the trust value assigned to the certification authority is "not trusted", then the host-identification mapping extension not certified, regardless of whether the proof of identity possession data entry appears in the host-identification mapping extension.

BRIEF DESCRIPTION OF THE DRAWINGS

Referring to the exemplary drawings wherein like elements are numbered alike in the several Figures.

DETAILED DESCRIPTION

Figure 1:
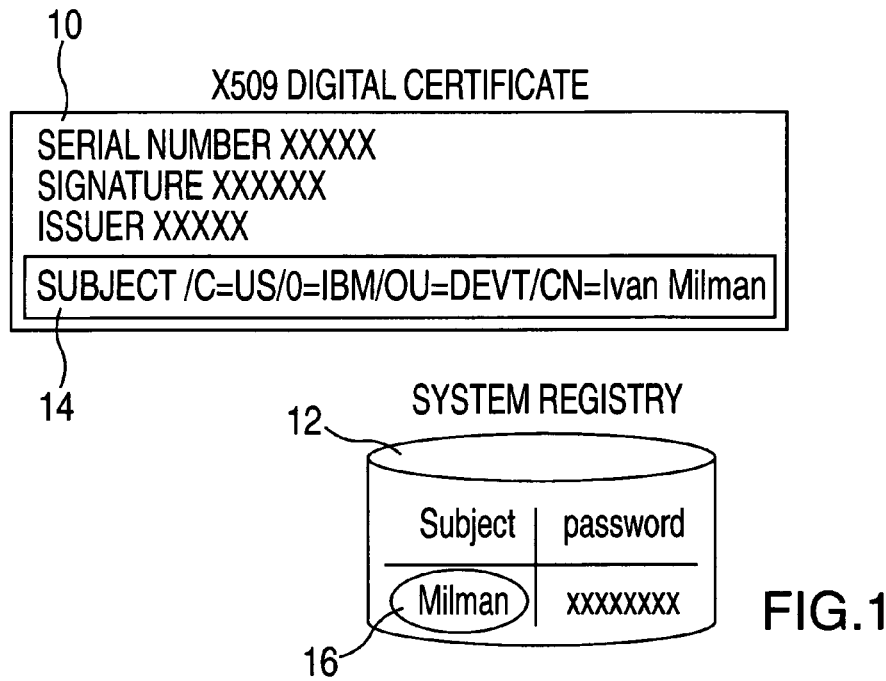
FIG. 1 illustrates representative drawings of information contained in a digital certificate and information contained in a system registry for a host server.
Figure 2:
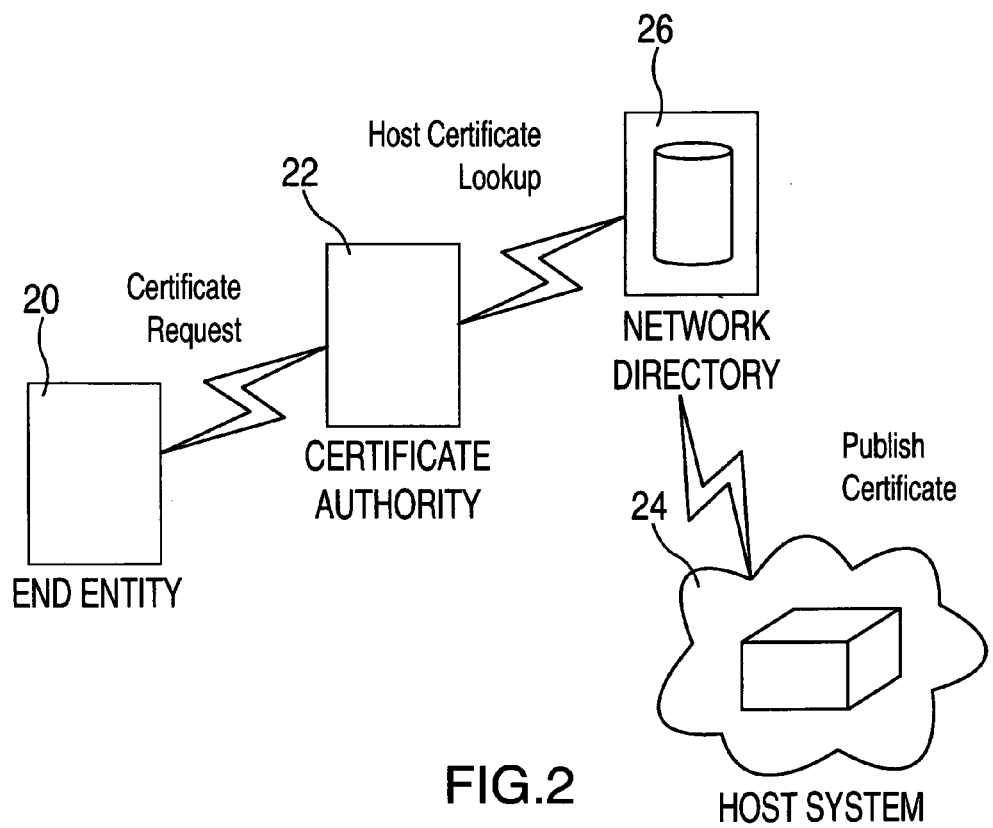
FIG. 2 is a block diagram illustrating the relationship between participating entities in certification of a host-identity mapping extension.

Referring initially to FIG. 2, there is shown a block diagram illustrating the relationship between participating entities in certification of a host-identity mapping extension. An end entity 20 (key holder) has a digital certificate 10 (FIG. 1) issued by a certificate authority (CA) 22. As indicated earlier, however, the subject identity 14 for the end entity 20 on the digital certificate 10 may not correspond to the subject identity 16 associated with the end entity's use of a host system 24. Accordingly, a host identity mapping extension may be added to digital certificate 10, which is of X.509 v3 format. The host identity mapping extension preferably includes additional identification attributes such as a host name, a subject identification name (matching, for example, subject identity 16 in a host system registry) and, optionally, a proof of identity possession (PIP) value. The structure of such a host identity mapping extension may be implemented as shown below using Abstract Syntax Notation I (ASN.I) constructs:

```
HostIdMapping ::=SEQUENCE { - - original version
    hostName          [1] IMPLICIT IA5String,
    subjectID         [2] IMPLICIT IA5String,
    proofOfIdPossession IdProof    OPTIONAL
}
IdProof ::= SEQUENCE {
    secret          OCTET STRING,
    encryptionAlgorithm OBJECT IDENTIFIER
}
```

With the proliferation of public key authentication technology, each host system 24 will ultimately be associated with a public key certificate. The public key certificate may be published in, and retrieved from, a public network directory 26 (much the same as a person's telephone number is published in telephone directory). In order to facilitate the incorporation of the additional attributes into the host identification mapping extension, the end entity 20 encrypts the proof of identification possession entry (password) into the host identification mapping extension using the public key of the certificate authority 22 as part of a certificate request message. In response, the CA 22 decrypts the password with its own private key and then re-encrypts it using the public key of the host system 24, which was accessed through public network directory 26.

As also mentioned previously, a problem potentially arises whenever the CA 22 is run by a different organization than the host system 24. The end user 20 may be reluctant to send password information to the CA 22, knowing that if the CA 22 is compromised the password could be used to impersonate the end user 20 on the host system 24. On the other hand, if the host system 24 permits the use of a certificate not having the password for logging in, the host system also has to trust the CA 22 that the subject identification is genuine.

Figure 3:
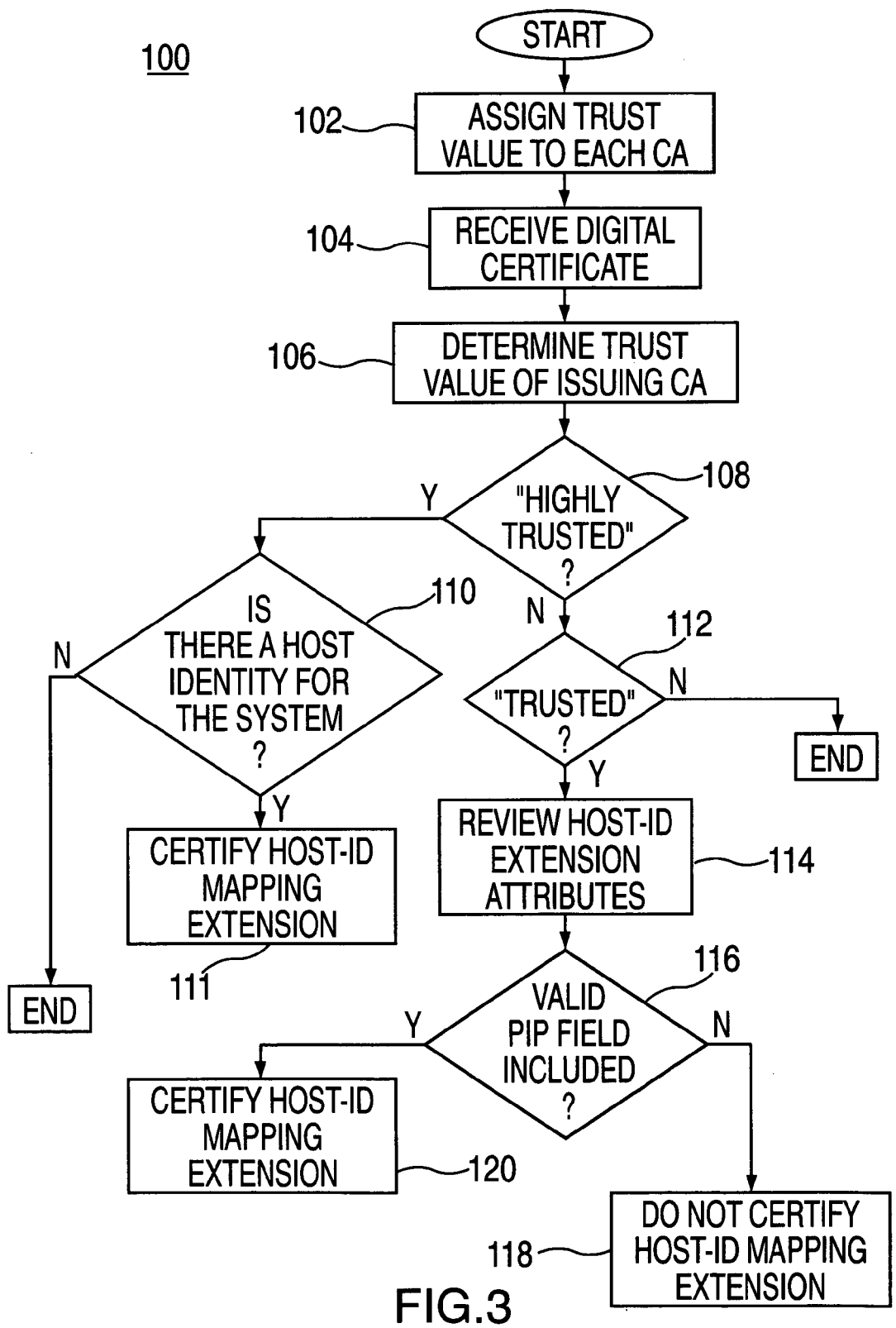
FIG. 3 is a flow diagram illustrating a method of certifying a host-identification mapping extension included in a digital certificate, in accordance with an embodiment of the invention.

Accordingly, in response to the aforementioned drawbacks, a method 100 of certifying a host-identification mapping extension included in a digital certificate is illustrated in FIG. 3, in accordance with an embodiment of the invention. Method 100 begins at block 102, where "trust values" are assigned to each certificate authority for a given set of certificate authorites. Because certificate authorities may be third-party entities or an internal organization, a particular certificate authority will necessarily have a certain degree of "trustworthiness" associated therewith. Thus, a binary system of trustworthiness (i.e., "trusted", "not trusted") is problematic. As a result, the trust value assigned to a given certificate authority at block 102 is chosen from a set of three possible values: "not trusted", "trusted", or "highly trusted". The decision on what trust value is assigned to what certificate authority may be made, for example, by a security administrator of a host system.

With a set of certificate authorities having a specific trust value assigned thereto, the host server may receive a digital certificate from an end user, at block 104, in an attempt to access the host server. The digital certificate contains the host identification mapping extension, which further has a set of attributes described hereinbefore. At block 106, the host server will first determine the trust value previously assigned to certificate authority issuing the digital certificate. If at decision block 108, it is determined that the trust value of the certificate authority is "highly trusted", then method 100 proceeds to decision block 110. At decision block 110, it is determined whether there is a corresponding host identity (host name) entry for the particular host system to be accessed, as explained in further detail hereinafter. If so, then the host identification mapping extension is automatically certified (honored) at block 111, without regard to the attributes contained therein.

However, if the CA is not "highly trusted", method 100 proceeds to decision block 112 where it determined whether the CA is "trusted". If the CA is not trusted, method 100 comes to an end and no further access is permitted by the host server. If the CA is "trusted", method 100 then proceeds to block 114 where the attributes contained in the host identification mapping extension are reviewed. Recalling that the host name and subject identification name are required fields, while the proof of identity possession (PIP) is an optional field, method 100 will then certify the host identification mapping extension only if the PIP field is included and the PIP field further contains valid PIP information (i.e., the encrypted password). Thus, at decision block 116, if it is determined that no PIP field is included, method 100 proceeds to block 118 where the host identification mapping extension is not certified (honored). If the PIP field is included, then the extension is certified at block 120.

It will be appreciated by those skilled in the art that multiple host identification mapping extensions may be included in a digital certificate, with each mapping extension may containing its own set of attributes. Each mapping extension may have a different host identification, each accessible by a single end user. For example, a company might have one domain name but have two host systems, A and B, with separate webserver instances. On system A, the webserver may back domain "www.a.com" and have a system id of its own such as WEBSRVA. Similarly, on system B, the webserver backs domain "www.b.com" and may have a system id such as WEBSRVB. An employee, Joe User, of the company may have one subject identification for system A (such as J_USER), and another subject identification for system B such as (JOE_U). Thus, the end user's certificate, if issued by a local CA, could have one host identification mapping for each system. When Joe User uses his certificate to log on to either system A or system B, the determination of which host identification mapping extension to honor would depend upon which resource the webserver has access to (see decision block 110 ). In the above example, the security administrators for each system could define a resource (e.g., IRR.HOST.WWW.A.COM or IRR.HOST.WWW.B.COM) which gives the respective systems read access thereto.

The present invention can include embodiments in the form of computer-implemented processes and apparatuses for practicing those processes. The present invention can also include embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also include embodiments in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of authenticating a host-identification mapping extension included in a digital certificate, the digital certificate, issued and signed by a specific certification authority, the method comprising:
    assigning a trust value for each certification authority included in a set of certification authorities, said trust value being based on a corresponding organization responsible for operating said certification authority, and said trust value corresponding to one of the following values: "not trusted", "trusted", or "highly trusted";
    receiving said digital certificate containing said host-identification mapping extension, said host-identification mapping extension containing a plurality of identification attributes,
        including a host name, a subject identification name and optionally a proof of identity possession entry;
        if the trust value assigned to the specific certification authority issuing said digital certificate is "highly trusted" and said host identification mapping extension contains a corresponding host name for a host system to be accessed, then honoring said host-identification mapping extension regardless of whether said proof of identity possession data entry appears in said host-identification mapping extension; and
        if the trust value assigned to said certification authority is "trusted", then said host-identification mapping extension is certified only if said proof of identity possession data entry appears in said host-identification mapping extension, and contains valid information as verified by a host corresponding to said host name included in said plurality of identification attributes.

2. The method of claim 1, wherein said digital certificate is an X.509 v3 digital certificate.

3. The method of claim 1, wherein:
    if said trust value assigned to said certification authority is "not trusted", then said host-identification mapping extension is not honored regardless of whether said proof of identity possession data appears in said host-identification mapping extension.

4. The method of claim 1, wherein said proof of identity possession entry further comprises a password.

5. The method of claim 1 wherein the trust value assigned to the certification authority issuing said digital certificate is specified independently of said certificate.

6. A storage medium encoded with a machine readable computer program code for authenticating a host-identification mapping extension included in a digital certificate, issued and signed by a specific certification authority, the storage medium including instructions for causing a computer to implement a method, the method comprising:
    assigning a trust value for each certification authority included in a set of certification authorities said trust value being based on a corresponding organization responsible for operating said certification authority, and said trust value corresponding to one of the following values: "not trusted", "trusted", or "highly trusted";
    receiving said digital certificate containing said host-identification mapping extension, said host-identification mapping extension containing a plurality of identification attributes, a subject identification name, said subject identification name
        including a host name, a subject identification name and optionally a proof of identity possession entry;
        if the trust value assigned to the specific certification authority issuing said digital certificate is "highly trusted" and said host identification mapping extension contains a corresponding host name for a host system to be accessed, then honoring said host-identification mapping extension regardless of whether said proof of identity possession data entry appears in said host-identification mapping extension; and
        if the trust value assigned to said certification authority is "trusted", then said host-identification mapping extension is certified only if said proof of identity possession data entry appears in said host-identification mapping extension, and contains valid information as verified by a host corresponding to said host name included in said plurality of identification attributes.

7. The storage medium of claim 6, wherein said digital certificate is an X.509 v3 digital certificate.

8. The storage medium of claim 6, wherein:
    if said trust value assigned to said certification authority is "not trusted", then said host-identification mapping extension is not honored regardless of whether said proof of identity possession entry appears in said host-identification mapping extension.

9. The storage medium of claim 6, wherein said proof of identity possession entry further comprises a password.

10. The storage medium of claim 6, wherein the trust value assigned to the certification authority issuing said digital certificate is specified independently of said certificate.

* * * * *